Aug. 29, 1950  I. L. ROBBLEE  2,520,260
EMERGENCY TRACTION DEVICE FOR VEHICLE WHEELS
Filed Feb. 18, 1948

Inventor:
Ide L. Robblee
By Charles R. Fay,
Attorney

Patented Aug. 29, 1950

2,520,260

UNITED STATES PATENT OFFICE 2,520,260

EMERGENCY TRACTION DEVICE FOR VEHICLE WHEELS

Ide L. Robblee, Southbridge, Mass.

Application February 18, 1948, Serial No. 9,097

6 Claims. (Cl. 152—228)

This invention relates to emergency traction units for the application to vehicle wheels to enable the vehicle under its own power to drive out of a mud hole, snow bank, or sand, in which the vehicle may be stalled.

The principal object of the invention resides in the provision of an effective device of the class described which is extremely simple to apply to the wheel of a vehicle and which is also easily removed therefrom after use.

Another object of the invention resides in the provision of a clamp adapted to be easily applied to the wheel of a vehicle and comprising a pair of pivoted members, one of which is adjustably pivoted and the other of which is swingable toward the wheel to which it is to be attached by means of a simple cam lock and pivoted arm or lever arrangement, whereby the device is applied to a wheel merely by thrusting it onto the tire casing and then swinging the cam lock arm in toward the wheel, the device being then locked by firmly gripping the tire at the sides thereof; and which conversely is easily unlocked merely by swinging out the cam lock lever.

Other objects and advantages of the invention will appear hereinafter.

Reference is to be had to the accompanying drawings in which

Figure 1:
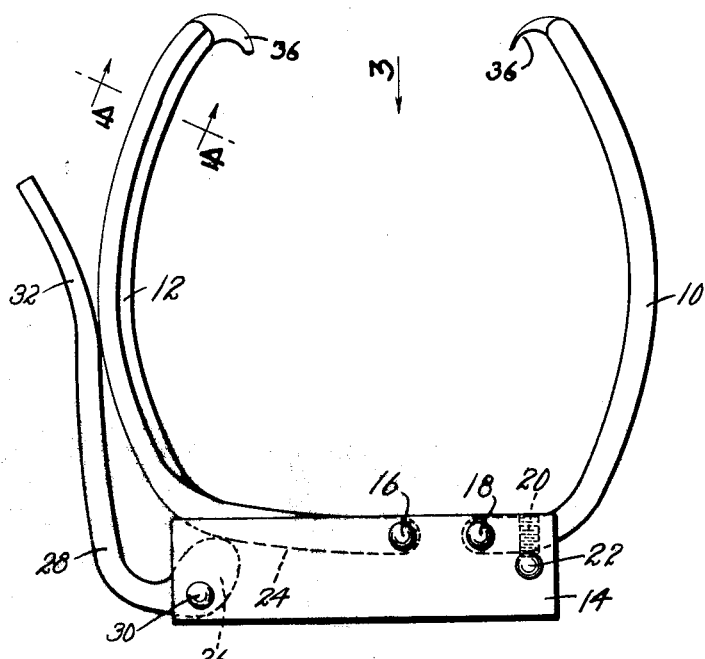
Fig. 1 is a view in elevation of a device according to the present invention, and showing the same in clamping condition.
Figure 2:
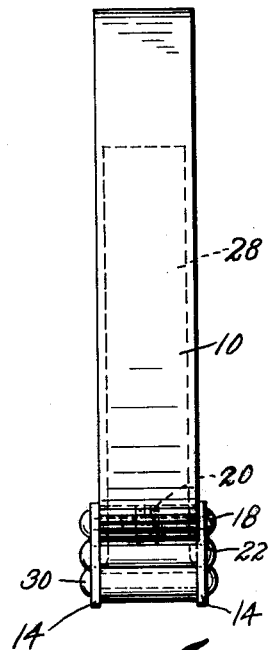
Fig. 2 is a view in edge elevation of Fig. 1.
Figure 3:
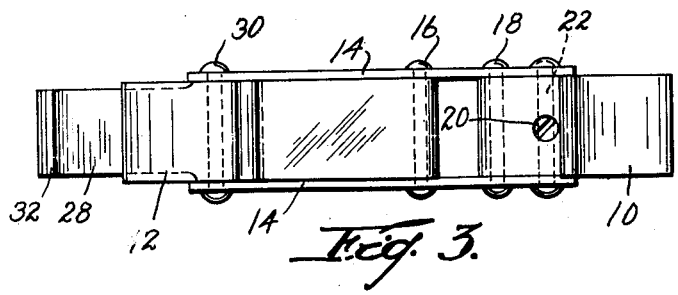
Fig. 3 is a top plan view of the device of Fig. 1 looking in the direction of arrow 3.

As is well known in the art the main objection to tire chains, mud hooks, emergency units and the like resides in the fact that the same are difficult to apply to the wheel of the vehicle and usually involve at least the necessity of the operator getting under the fender itself, to his great inconvenience, etc.

It is, therefore, a most valuable consideration to provide a device of the class described, which is easy to apply to a vehicle wheel without the necessity of getting under the vehicle and, as a matter of fact, in the present case the invention may be applied to the vehicle wheel merely by stooping down, thrusting the device onto the tire casing and then pushing inwardly on a cam lock lever, the latter being easily accessible at the side of the device.

As shown in the drawing, the present invention provides an arm 10 and a complementary arm 12, both of which are pivotally mounted on a pair of spaced plates 14 by means of headed pin and sleeve pivots 16 and 18, which also serve to space the plates and hold the same together in fixed relation.

The arm 10 is provided with a set screw 20 near the pivot 18 which is adapted to bear on a cross pin 22 for the purpose of adjusting the pivoted position of arm 10 relative to the base of the device formed by the plates 14 and also relative to arm 12.

Arm 12 is pivoted on the plates 14 close to the pivot 18 so that a relatively elongated bearing surface at 24 is provided for contact of a cam lock 26, the latter being provided with an elongated lever 28 integral therewith, the cam lock and lever being pivoted by a pin 30 to the plates 14. It is to be noted that the lever 28 is bent outwardly as at 32.

In the operation of the device, the lever 28 is swung counter-clockwise in Fig. 1, so as to release element 12, whereby the two pivoted arms 10 and 12 are spaced a distance apart sufficient to receive a tire casing between them, it being understood that the set screw 20 may be used to adjust this relation for different sizes of tires if necessary. With the lever 28 in loose condition it is merely necessary to grasp the base formed by plates 14 in the hand and thrust the device onto the tire casing of the vehicle, then swing lever 28 in toward arm 12, this action moving the latter inwardly and clamping it against the tire casing. When it is desired to remove the device it is necessary merely to open the lever 28 and this can be done by pushing on the bent-out portion 32 by the toe of the operator. The plates 14 form a long wearing, sturdy traction member which does not get out of order.

Figure 4:
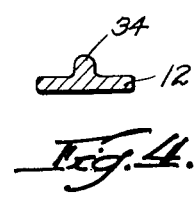
Fig. 4 is a section on line 4—4 of Fig. 1.

It is preferable to make the present device strong and sturdy, but weight may be reduced by forming the arms and lever 18 with a thin section, as shown in Fig. 4, and a stiffening rib 34.

Also, if desired, inwardly directed hooks 36 may be provided at the free ends of arms 10 and 12 to hook over the wheel rim to absolutely prevent dislodgement of the device under all conditions.

Having thus described my invention and the advantages thereof, I do not wish to be limited to the details herein disclosed otherwise than as set forth in the claims, but what I claim is:

1. In a device of the class described, a base, a pair of pivoted arms thereon to receive a vehicle wheel therebetween, and a locking lever pivoted on the base and engageable with but one of the arms to move the same toward the other arm and lock it in position against the vehicle wheel, and means stopping the other arm against outward movement away from the lever-engaged arm, said other arm being free to move inwardly toward the former.

2. The device of claim 1 wherein said base comprises a pair of plates, the arms being located between the plates, and the latter being open at their edges to provide a pair of traction elements.

3. In a device of the class described, a base, a pair of arms pivoted thereto, said arms bowing outwardly away from each other and then inwardly toward each other at their free ends to receive and grasp a tire, a cam locking lever pivoted to the base and engageable with one of said arms to swing the same in toward the other arm and lock the vehicle tire therebetween, and adjustable means on the other arm engaging the base to position the said other arm relative thereto.

4. The device of claim 3 including an eccentric lock on the lever and bearing on said one arm and movable past a dead center by the lever.

5. The device of claim 3 wherein said adjustable means comprises an adjustable screw and including an abutment on the base against which the screw bears.

6. In a device of the class described, a base, a pair of pivoted arms thereon to receive a vehicle wheel therebetween, and a locking lever pivoted on the base and engageable with one of the arms to move the same toward the other arm and lock it in position against the vehicle wheel, and inwardly directed hooks at the ends of the arms to hook over the vehicle wheel rim.

IDE L. ROBBLEE.

REFERENCES CITED

The following references are of record in the file of this patent:

UNITED STATES PATENTS

| Number | Name | Date |
|---|---|---|
| 2,119,447 | Stahl | May 31, 1938 |
| 2,445,947 | Hoppes | July 27, 1948 |